(12) United States Patent
Ngai et al.

(10) Patent No.: US 9,083,415 B2
(45) Date of Patent: Jul. 14, 2015

(54) METHOD AND DEVICE FOR ANTENNA SEARCHING WITH ANTENNA SELECTION

(71) Applicant: QUALCOMM Incorporated, San Diego, CA (US)

(72) Inventors: Francis Ming-Meng Ngai, Louisville, CO (US); Stanley Tsai, Frederick, CO (US); Thiagarajan Sivanadyan, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 13/658,695

(22) Filed: Oct. 23, 2012

(65) Prior Publication Data

US 2013/0102316 A1   Apr. 25, 2013

Related U.S. Application Data

(60) Provisional application No. 61/550,647, filed on Oct. 24, 2011.

(51) Int. Cl.
| | |
|---|---|
| H04W 4/00 | (2009.01) |
| H04B 1/04 | (2006.01) |
| H04M 1/00 | (2006.01) |
| H04W 36/00 | (2009.01) |
| H04B 7/08 | (2006.01) |
| H04B 17/382 | (2015.01) |

(52) U.S. Cl.
CPC ............ H04B 7/0837 (2013.01); H04B 17/382 (2015.01)

(58) Field of Classification Search
CPC ...................... H04B 2201/70701; H04B 1/406; H04W 88/06; H04W 48/18; H04W 48/16
USPC .......................... 455/127.4, 553, 101, 553.1, 455/435.2–435.3, 436, 550.1
See application file for complete search history.

(56) References Cited

U.S. PATENT DOCUMENTS

| | | | |
|---|---|---|---|
| 6,002,672 A | 12/1999 | Todd | |
| 7,359,692 B2 | 4/2008 | Saed et al. | |
| 7,366,139 B2 | 4/2008 | Poegel et al. | |
| 2001/0039198 A1* | 11/2001 | Onishi et al. | 455/562 |

(Continued)

FOREIGN PATENT DOCUMENTS

JP   2007274117 A   10/2007

OTHER PUBLICATIONS

International Search Report and Written Opinion—PCT/US2012/061699—ISA/EPO—Jan. 15, 2013.

*Primary Examiner* — Dung Hong
(74) *Attorney, Agent, or Firm* — Charles E. Eggers

(57) ABSTRACT

Methods, devices, and computer program products for antenna searching with antenna selection are disclosed. In one aspect, an apparatus operable in a wireless communication system includes a first receiver, a second receiver, and a processor. The first receiver receives a first signal including pilot signals from a first antenna. The second receiver receives a second signal including pilot signals from a second antenna. The processor, while a receive diversity is enabled, demodulates the first and second signals, determines whether a first condition is satisfied, and, in response to determining that the first condition is satisfied, searches for pilot signals via the second receiver and not the first receiver. The first condition is satisfied when a signal strength of the first signal does not exceed a first threshold and a signal strength of the second signal exceeds a second threshold.

12 Claims, 12 Drawing Sheets

(56) References Cited

U.S. PATENT DOCUMENTS

| | | |
|---|---|---|
| 2006/0165156 A1* | 7/2006 | Kanemoto et al. ............ 375/145 |
| 2006/0281486 A1* | 12/2006 | Ngai et al. ................ 455/552.1 |
| 2008/0095132 A1 | 4/2008 | Lindoff et al. |
| 2008/0227414 A1* | 9/2008 | Karmi et al. ................. 455/101 |
| 2009/0116568 A1 | 5/2009 | Lindoff et al. |
| 2009/0247091 A1 | 10/2009 | Jalloul et al. |
| 2010/0246471 A1* | 9/2010 | Chen et al. .................... 370/312 |
| 2010/0304744 A1 | 12/2010 | Hu et al. |
| 2012/0057621 A1 | 3/2012 | Hong et al. |

* cited by examiner

METHOD AND DEVICE FOR ANTENNA SEARCHING WITH ANTENNA SELECTION

CROSS REFERENCE TO RELATED APPLICATIONS

This application claims benefit under 35 U.S.C. §119(e) to U.S. Provisional Patent Application No. 61/550,647 entitled "METHOD AND DEVICE FOR ANTENNA SEARCHING WITH ANTENNA SELECTION" filed on Oct. 24, 2011; the disclosure of which is hereby incorporated by reference in its entirety.

FIELD

This application relates generally to wireless communication, and more specifically, to antenna searching with antenna selection implemented in a wireless communication device.

BACKGROUND

Wireless communication systems generally include an access terminal, commonly referred to as a wireless unit or mobile telephone, which communicates with one or more base stations when making a call. The access terminal communicates with the base stations on one or more channels within a frequency band assigned to the access terminal by a base station controller. A communication from the access station to a base station is made on what is called the "reverse link," and a communication from the base station to the access terminal is made on the "forward link."

SUMMARY

The systems, methods, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features provide advantages that include preserving system capacity during certain soft handoffs.

One aspect of this disclosure is an apparatus operable in a wireless communication system, the apparatus comprising: a first receiver configured to receive a first signal from a first antenna, the first signal comprising pilot signals; a second receiver configured to receive a second signal from a second antenna, the second signal comprising pilot signals; and a processor configured to, while a receive diversity is enabled, demodulate the first and second signals, determine whether a first condition is satisfied, the first condition satisfied when a signal strength of the first signal does not exceed a first threshold and a signal strength of the second signal exceeds a second threshold, and in response to determining that the first condition is satisfied, search for pilot signals via the second receiver and not the first receiver.

Another aspect of this disclosure is a method of antenna searching implemented in a wireless communication device, the method comprising: demodulating first and second signals while a receive diversity is enabled, the first signal comprising pilot signals and received by a first receiver from a first antenna, the second signal comprising pilot signals and received by a second receiver from a second antenna; determining whether a first condition is satisfied, the first condition satisfied when a signal strength of the first signal does not exceed a first threshold and a signal strength of the second signal exceeds a second threshold; and in response to determining that the first condition is satisfied, searching for pilot signals via the second receiver and not the first receiver.

Another aspect of this disclosure is an apparatus operable in a wireless communication system, the apparatus comprising: first means for receiving a first signal from a first antenna, the first signal comprising pilot signals; second means for receiving a second signal from a second antenna, the second signal comprising pilot signals; means for demodulating the first and second signals while a receive diversity is enabled; means for determining whether a first condition is satisfied, the first condition satisfied when a signal strength of the first signal does not exceed a first threshold and a signal strength of the second signal exceeds a second threshold; and means for searching for pilot signals via the second means and not the first means in response to determining that the first condition is satisfied.

Another aspect of this disclosure is a non-transitory computer readable medium comprising instructions that when executed cause an apparatus to: demodulate first and second signals while a receive diversity is enabled, the first signal comprising pilot signals and received by a first receiver from a first antenna, the second signal comprising pilot signals and received by a second receiver from a second antenna; determine whether a first condition is satisfied, the first condition satisfied when a signal strength of the first signal does not exceed a first threshold and a signal strength of the second signal exceeds a second threshold; and in response to determining that the first condition is satisfied, search for pilot signals via the second receiver and not the first receiver.

DETAILED DESCRIPTION

Figure 1:
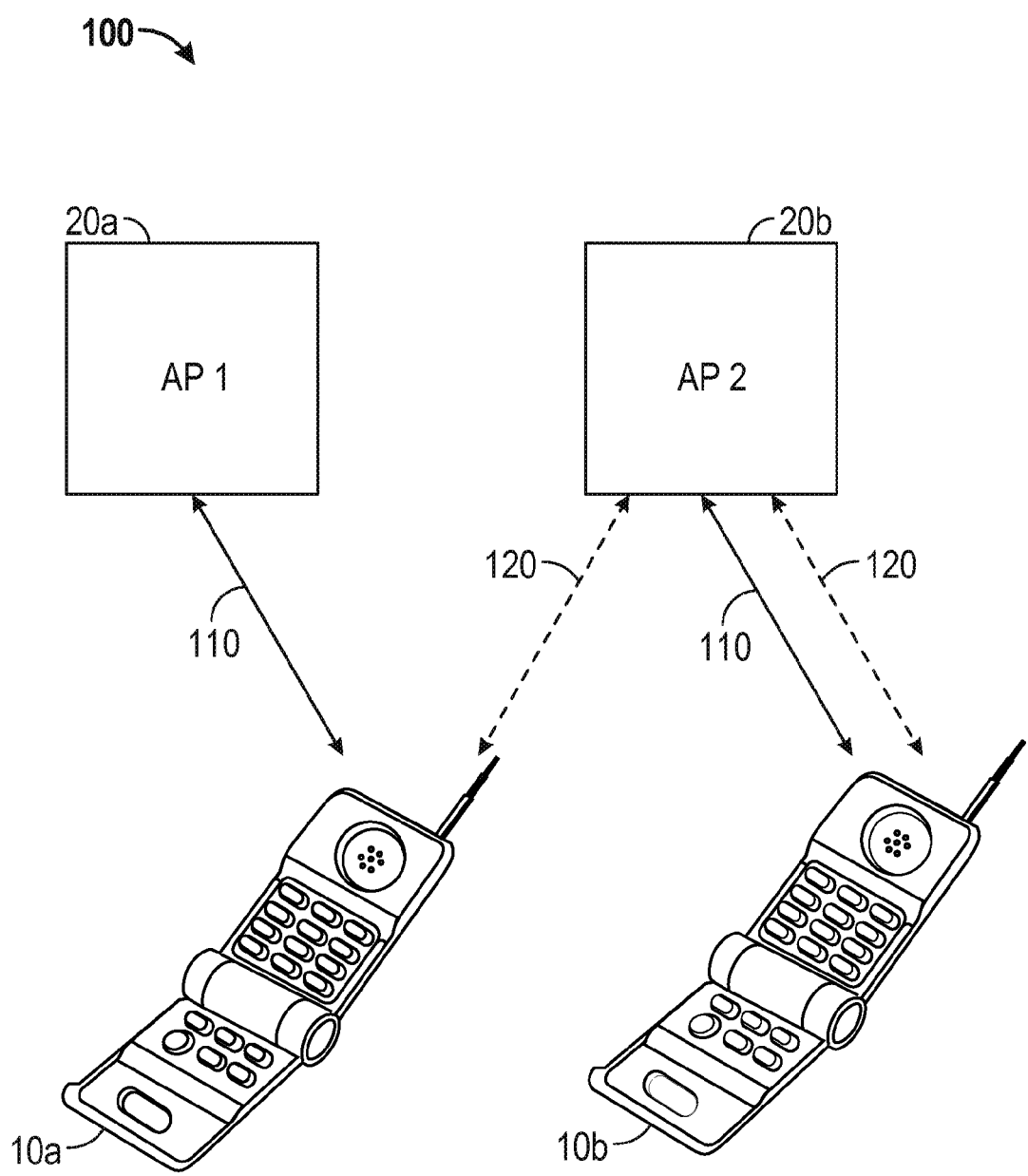
FIG. 1 is a diagram illustrating wireless communication devices engaged in wireless communication with access points.

Access terminals often search for multiple base stations during a call with one base station so that the access terminals may continue the call uninterrupted if communication is lost with the one base station. The multiple base stations may facilitate soft handoffs in which the access terminals commence communications with a new base station without interrupting communications with the previous base station. To perform a soft handoff, an access terminal may search for, and may be continuously assigned, pilot channels ("pilots" or "pilot signals") via a signal received by a primary antenna and processed by a primary antenna receive chain of the access terminal. When the access terminal detects a pilot signal of sufficient strength that is not associated with forward link traffic channels assigned to the access terminal, the access terminal may send a pilot strength measurement message to the base station with which it is currently communicating. The base station may then assign a forward link traffic channel and direct the access terminal to perform a handoff.

During the pilot searching process, the strength of a signal received by a primary antenna may significantly weaken. In some systems, if the strength weakens too significantly, a call may be lost because the signal processed by a primary antenna receive chain may be the only signal searched for pilot signals.

Advantageously, the systems and methods described in this disclosure may dynamically search one or more receive chains of multiple antennas for pilot signals when a receive diversity is enabled. In one aspect, the search for pilot signals at one time may occur via one antenna receive chain of multiple receive chains. The one antenna receive chain may be selected based on a strength of a signal received by one antenna relative to a threshold and/or relative to strengths of signals received by one or more other antennas and/or based on the strengths of the signals received by the one or more other antennas relative to thresholds. For example, the search for pilot signals may occur via only a secondary antenna receive chain when both a strength of a signal processed by a primary antenna receive chain is below a threshold and a strength of a signal processed by the secondary antenna receive chain exceeds a threshold. Accordingly, in some aspects, benefits of single antenna pilot searching (e.g., reduced use of wireless network resources and increased access terminal system capacity, for instance, due to maintaining an average active pilot set size) may be maintained by searching only a secondary or other antenna receive chain when the strength of a signal received by a primary antenna may be weak.

In another aspect, the search for pilot signals at one time may generally occur via one antenna receive chain. However, if strengths of signals processed by multiple receive chains are each below thresholds, the search for pilot signals may occur via two or more receive chains. As a result, in some aspects, a larger data set from two or more receive chains may advantageously be searched for pilot signals when the strengths of signals received by an access terminal may be weak, thereby increasing the likelihood that new base stations are discovered.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. The following are examples of distinct radio technologies that may be used with the methods and devices described herein: various Universal Terrestrial Radio Access (UTRA) radio technologies, various cdma2000 radio technologies, Wideband-CDMA (W-CDMA), Low Chip Rate (LCR), IS-2000, IS-95, IS-856, Global System for Mobile Communications (GSM), Evolved UTRA (E-UTRA), IEEE 802.11, IEEE 802.16, IEEE 802.20, Flash-OFDM, Long Term Evolution (LTE) etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2).

The methods and devices described herein may be used by access terminals as well as access points. An access terminal may be stationary or mobile and may also be referred to as a mobile station, a user equipment (UE), a mobile equipment, a terminal, a subscriber unit, a station, etc. An access terminal may be a cellular phone, a personal digital assistant (PDA), a handset, a wireless communication device, a handheld device, a wireless modem, a laptop computer, and the like. An access point is generally a fixed station that communicates with the access terminals and may also be referred to as a base station, a Node B, etc.

FIG. 1 is a diagram illustrating wireless communication devices 10 engaged in wireless communication with access points 20. Each wireless communication device 10 can simultaneously establish a first interface 110 and a second interface 120 between itself and the access points 20.

Figure 2:
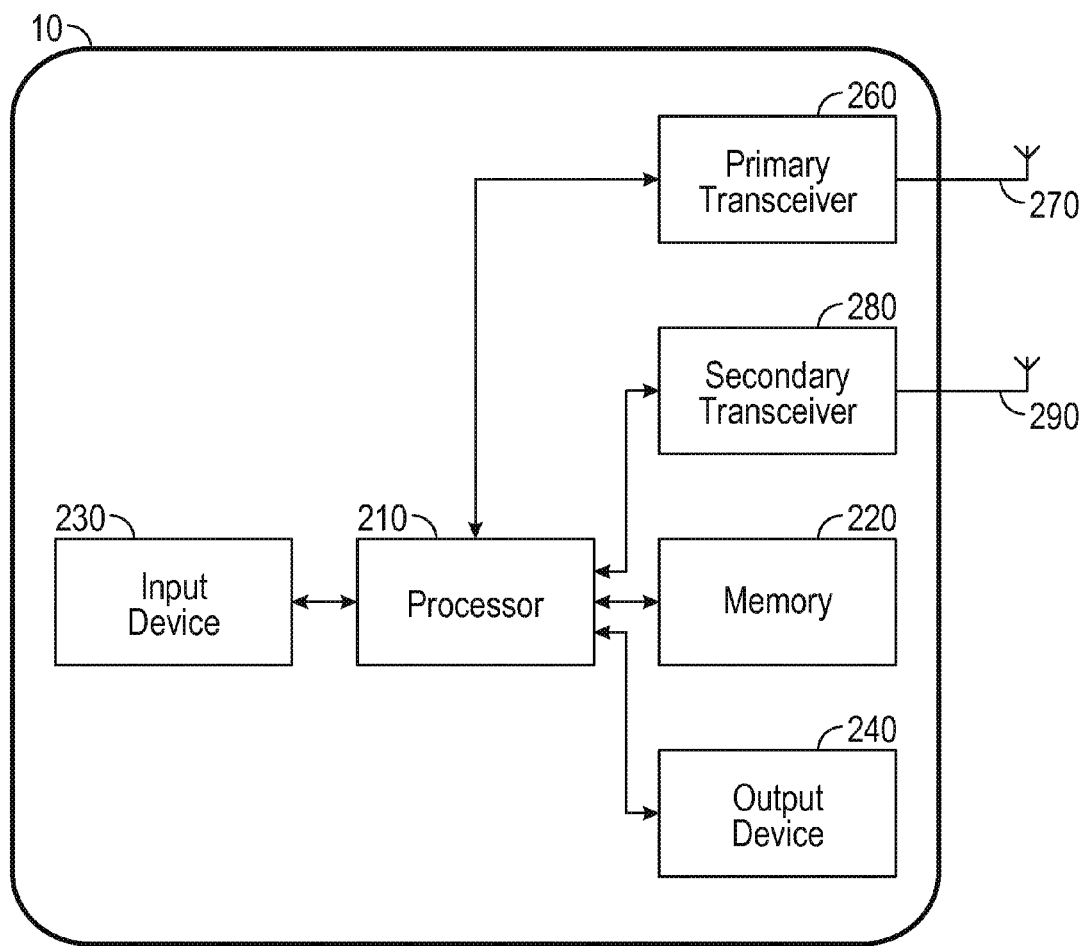
FIG. 2 is a functional block diagram of example components of a wireless communication device.

FIG. 2 is a functional block diagram of example components of the wireless communication device 10 of FIG. 1. The wireless communication device 10 may include a processor 210 in data communication with a memory 220, an input device 230, and an output device 240. The processor is further in data communication with a primary transceiver 260 and a secondary transceiver 280. The primary transceiver 260 is in data communication with a primary antenna 270, and the secondary transceiver 280 is in data communication with a secondary antenna 290. Although described separately, the functional blocks described with respect to the wireless communication device 10 may not be separate structural elements. For example, the processor 210 and memory 220 may be embodied in a single chip. Similarly, the processor 210, primary transceiver 260, and secondary transceiver 280 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may be implemented as a combination of computing devices, for instance, a combination of a DSP and a microprocessor, a plurality of microprocessors, one or more microprocessors in conjunction with a DSP core, or the like.

The processor 210 may be coupled, via one or more buses, to read information from or write information to memory 220. The processor 210 may additionally, or in the alternative, contain memory (not shown), such as processor registers. The memory 220 can include a processor cache, including a multi-level hierarchical cache in which different levels have different capacities and access speeds. The memory 220 can include random access memory (RAM), other volatile or non-volatile storage devices, such as hard drives, optical discs, such as compact discs (CDs) or digital video discs (DVDs), flash memory, floppy discs, magnetic tape, or Zip drives.

The processor 210 may be coupled to an input device 230 and an output device 240 for receiving inputs from and providing outputs to, respectively, a user of the wireless communication device 10. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 may be coupled to a primary transceiver 260 and secondary transceiver 280. The primary transceiver 260 and secondary transceiver 280 may each comprise a transmitter or receiver, or both, as well as a modulator or demodulator, or both a modulator-demodulator (modem). The primary transceiver 260 may prepare data generated by the processor 210 for wireless transmission via the primary antenna 270 according to one or more air interface standards. Similarly, the secondary transceiver 280 may prepare data generated by the processor 210 for wireless transmission via the secondary antenna 290 according to one or more air interface standards. Further, the primary transceiver 260 may demodulate data received via the primary antenna 270 according to one or more air interface standards, and the secondary transceiver 280 may demodulate data received via the secondary antenna 290 according to one or more air interface standards. The primary transceiver 260 and secondary transceiver 280, may be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. Further, the processor 210 and/or primary transceiver 260 and secondary transceiver 280 may include a receive diversity function (e.g., mobile receive diversity) that may statically or dynamically disable/enable functioning of the primary transceiver 260 or secondary transceiver 280. For instance, the secondary transceiver 280 may only receive transmissions if a receive diversity is enabled while the primary transceiver 260 may receive transmissions regardless of whether the receive diversity is enabled.

Figure 3:
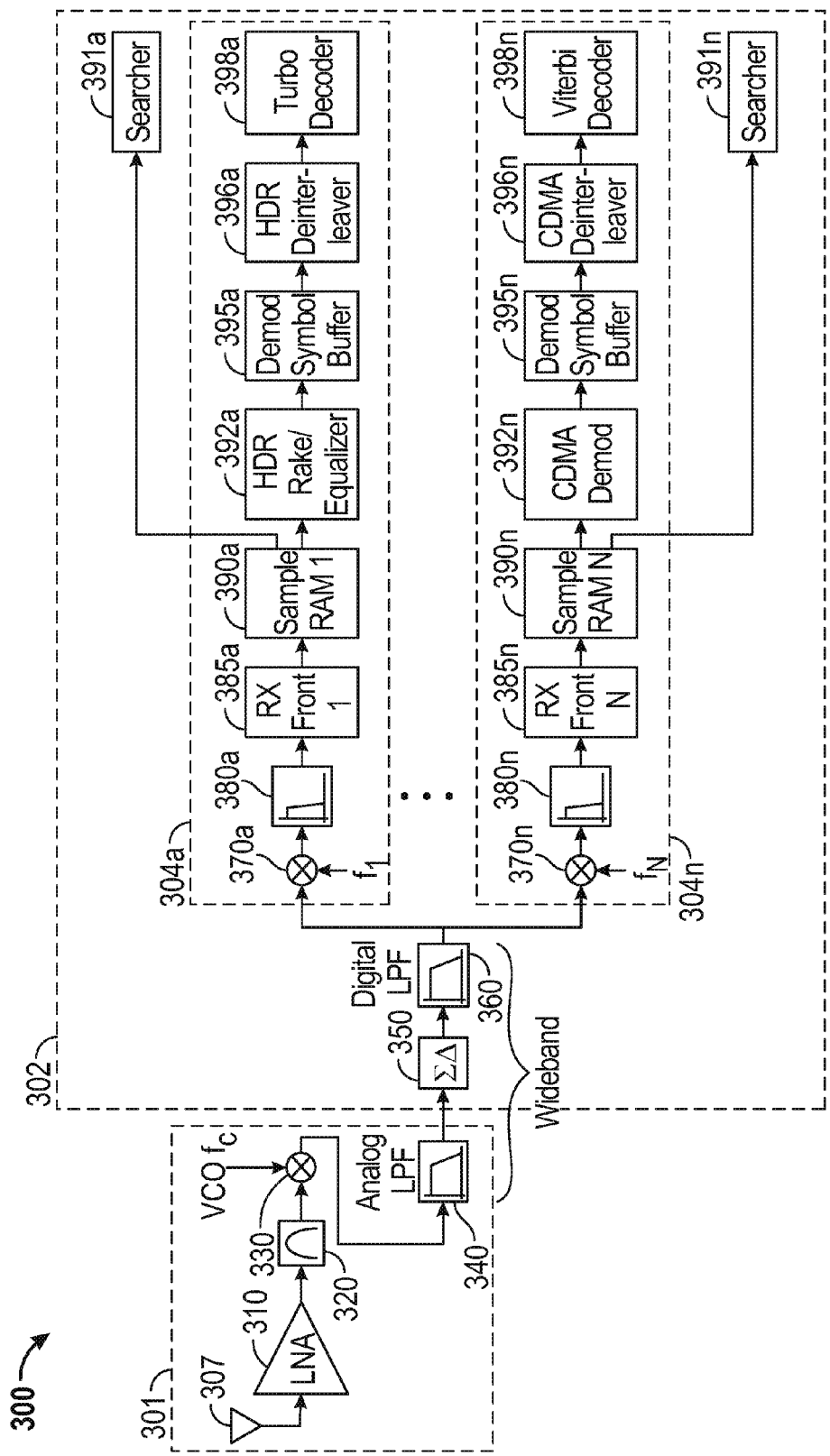
FIG. 3 is a functional block diagram of an example receiver of a wireless communication device.

FIG. 3 is a functional block diagram of an example receiver 300 of a wireless communication device, such as the wireless communication device 10 of FIG. 2. The receiver 300 may, for example, illustrate components of the primary transceiver 260 with primary antenna 270 or the secondary transceiver 280 with the secondary antenna 290. The receiver 300 may receive signals over a configurable frequency range. The receiver 300 may include a receive chain 301 and a digital section 302. The digital section 302 is divided into N digital process chains 304. Each digital process chain may correspond to a decoding path for a signal sent using a particular type of air interface. Each air interface may use a different coding scheme and different decoding hardware to decode the signal. Two paths are described, however, other paths may be provided in addition to or in place of the described paths. The first path 304a may correspond to the demodulation path for a high data rate signal, such as a DO signal. The second path 304n may correspond to the demodulation path for a voice signal, such as a 1xRTT signal.

The receive chain 301 may receive a signal including multiple signals sent over multiple air interfaces. Accordingly, rather than using multiple copies of each component in the receive chain 301 to receive multiple signals over multiple air interfaces, a single copy of each component may be used. Further, components of the digital section 302 may be shared to process multiple signal received over multiple air interfaces. For example, a single analog-to-digital converter and a single digital lowpass filter may be used for processing the multiple signals. This may reduce cost and/or complexity of the primary transceiver 260 or secondary transceiver 280.

The receive chain 301 may implement a super-heterodyne architecture or a direct-conversion architecture. In the super-heterodyne architecture, a received signal is frequency downconverted in multiple stages, for example, from RF to an intermediate frequency (IF) in one stage, and then from IF to baseband in another stage. In the direct-conversion architecture, which is also referred to as a zero-IF architecture, the received RF signal is frequency downconverted from RF directly to baseband in one stage. The super-heterodyne and direct-conversion architectures may use different circuit blocks and/or have different circuit requirements. The following description assumes the use of the direct-conversion architecture as a non-limiting example.

A signal may be received on the antenna 307 and passed to the receive chain 301. The received signal may include multiple signals sent over multiple air interfaces. A low noise amplifier (LNA) 310 of receive chain 301 may receive and amplify the received signal with a gain $G_{LNA}$ and provide an amplified signal. The gain $G_{LNA}$ may be calculated based on the received signal strength (Rx Automatic Gain Control (AGC) measured in dB) of each of the multiple signals of the received signal. For example, the Rx AGC of a signal may be below a threshold value. The threshold value may be a value sufficient to allow the signal to be processed. If the Rx AGC of the signal is too low, the $G_{LNA}$ may be increased. In one embodiment, since only one LNA applies the same $G_{LNA}$ to multiple signals, the $G_{LNA}$ is based on the weakest signal to make sure the Rx AGC is sufficient for all the signals. In another embodiment, the $G_{LNA}$ may be based on the weakest signal as well as additional criteria. For example, the receiver 300 may determine if one signal has a signal strength that, if amplified by $G_{LNA}$ based on the weakest signal, would saturate an analog-to-digital converter (ADC) 350 of the receiver 300 (i.e., the signal exceeds the input range of the ADC 350). In order to avoid saturation, the $G_{LNA}$ may be based on another received signal, and the weakest signal may be dropped (e.g., the frequency range that is received may be configured to a range that does not include the weakest signal) or go unused. The Rx AGC may be measured for each of the multiple signals using the digital section 302 as discussed below. In addition, since the Rx AGC may be a property of the received signal processed by the receive chain 301, the Rx AGC may further be considered a property of the receive chain 301 or receiver 300 that processes the received signal.

A bandpass filter 320 may filter the signal from LNA 310 to remove out-of-band signal components and provide an input signal. Bandpass filter 320 may be a surface acoustic wave (SAW) filter, a ceramic filter, or some other type of filter. A mixer 330 may frequency downconvert the input signal from RF to baseband with an analog local oscillator (LO) signal of a frequency $f_c$ from an LO generator. The LO generator may include a voltage controlled oscillator (VCO), a phase locked loop (PLL), a reference oscillator, etc. Further, a variable gain amplifier (VGA) may amplify the downconverted signal from mixer 330 with a gain $G_{VGA}$. A summer may add a coarse DC offset estimate to remove DC offset in the amplified signal from the VGA. An analog lowpass filter 340 may filter the signal and provide an analog baseband signal to digital section 302.

Within digital section 302, an analog-to-digital converter (ADC) 350 may digitize the analog baseband signal at a sampling rate of $f_{ADC}$ and provide one or more sample streams. The ADC sampling rate may be fixed and selected based on the number and types of air interfaces that can be received simultaneously. Alternatively, the ADC sampling rate may be configurable and selected based on the number and types of air interfaces being received. Optionally, a pre-processor may perform pre-processing on the one or more sample streams from ADC 350. The sample streams may then be sent to a digital filter 350. Digital filter 350 may filter the sample stream to remove undesired signal components. The sample stream may be provided to each of the N digital process chains 304a to 304n. The sample stream may comprise data sent using multiple air interfaces.

Digital process chain 304a receives the sample stream, which may comprise a first signal sent using a first air interface and one or more additional signals. A rotator 370a may operate as a digital downcoverter, frequency downconvert the input sample stream with a digital LO signal, and provide a down converted sample stream of a first signal sent using a first air interface. The rotator 370a may multiply the input sample stream by a center frequency $f_1$, which is the center frequency channel over which the first signal was transmitted. A digital filter 380a may filter the downconverted sample stream to remove images caused by the digital downconversion and other undesired signal components.

The filtered signal may be sent to a receiver front end 385a, which processes the incoming signal. The front end 385a may measure the Rx AGC of the signal. As discussed above, the Rx AGC of the signal may be used to control the gain $G_{LNA}$ of the LNA 310. The Rx AGC may also be used to determine whether to add or drop frequencies at which signals are received. For example, if the total power within the frequency range currently received saturates the ADC 350 (i.e., the received signal exceeds the input range of the ADC 350), some signals may be dropped. Signals may be dropped, for example, by configuring the frequency range (e.g., by reducing the range or shifting the range) to not include some of the signals that saturate the ADC 350. For example, some signals may be preferred over other signals (e.g., voice signals may be preferred over data signals) and therefore non preferred signals may be dropped first when determining which signals to drop. Further, the front end 385a may scale the filtered samples to obtain the desired amplitude and provide an output sample stream to a sample random access memory (RAM) 390a, which temporarily stores the sample stream.

The sample stream may be accessed from sample RAM 390a by a searcher 391a. The searcher 391a may be configured to search the sample stream for pilot signals received over the center frequency $f_1$. The pilot signals may be sent by other communication devices such as access points. A pilot signal may comprise a known reference signal for determining the strength of signals received from an access point. The known reference signal may be compared to the received reference signal to determine signal quality. The strength of signals received from the access point may comprise an $E_{cp}/I_o$ ratio (energy of the pilot signal to energy of interfering signals ratio) or a signal-to-noise ratio. The pilot signal may also comprise an offset pseudo noise (PN) short code. The offset PN short code may comprise a code or sequence of numbers that identifies the access point and/or the access point type (e.g., femto, macro, pico). The offset PN short code may comprise a PN short code with a PN offset applied. The PN offset may indicate the delay from the true network synchronization time applied to a PN short code. In one embodiment, all of the access points may use the same PN short code.

However, a different PN offset may be applied to the PN short code for different access points. Thus, the PN offset directly correlates to the offset PN short code and the terms "PN offset" and "offset PN short code" may be used interchangeably herein. Accordingly, by identifying pilot signals with different PN offsets in the sample stream, the searcher 391a may identify additional access points transmitting over the center frequency $f_1$.

The location of the receiver 300 may be designed to be mobile. When the receiver moves to another coverage area, it may have to communicate with another cell or sector. To maintain quality of service, seamless transitions among the serving nodes are desirable for the receiver 300. That is, it is advantageous for the network operator of the system to provide seamless operations to the subscribers crossing the cells and sectors. To accomplish this, the digital section 302 may maintain an active pilot set in memory. For each sector or cell with the associated carrier reachable by the receiver 300 in the active pilot set, the cell identification and the pilot signal strength of the cell in a frequency band is kept. Information relating to any pilot signal reachable by the access terminal 14 is called a pilot signal set. As used herein, the terms "pilot signal set," "pilot set," and "set" may be used interchangeably.

A pilot signal may be added to the active pilot set when one or more criteria are met. Likewise the pilot signal may be removed from the active pilot set when yet another one or more criteria is met. For instance, when the pilot signal strength of the current cell or sector in a carrier that communicates with the access terminal becomes weak, and the pilot signal strength of a neighboring cell or sector in a carrier of the same or different frequency reaches a predetermined threshold, the access terminal may determine a change of serving cell or sector is in order and thereafter takes action to facilitate such a change. In a multicarrier system, in addition to the cell or sector and pilot signal strength information, carrier frequency information of each cell or sector is also included in the active pilot set.

A series of additional pilot sets may be used to manage the known and discovered pilots for possible promotion to the active pilot set. The different sets may include the pre-candidate pilot set, candidate pilot set, the neighbor pilot set, and the remaining pilot set. Each time a pilot signal is searched, a determination is made depending on its energy to either promote the pilot signal to another set, demote the pilot signal, or maintain the pilot signal in its current set.

The sample stream may be accessed from sample RAM 390a by a rake/equalizer receiver 392a comprising a rake receiver and/or an equalizer receiver. The rake/equalizer receiver 392a processes the signal. A rake receiver may be selected for some operating scenarios (e.g., low SNR) and an equalizer receiver may be selected for other operating scenarios (e.g., high SNR and/or high data rate). In general, either a rake receiver or an equalizer receiver may be selected depending on which receiver can provide better performance. The signal is then sent to a demodulation symbol buffer 395a, to buffer the signal for further processing. The signal is accessed from the buffer by a deinterleaver 396a, which may deinterleave (or reorder) the symbol estimates in a manner complementary to the interleaving performed by the transmitter that sent the signal. A decoder 398a (e.g., a turbo decoder) may decode the deinterleaved symbol estimates and provide decoded data.

Digital process chain 304n receives the sample stream, which may include a second signal sent using a second air interface and one or more additional signals. A rotator 370n may operate as a digital downcoverter, frequency downconvert the input sample stream with a digital LO signal, and provide a down converted sample stream of a second signal sent using a second air interface. The rotator 370n may multiply the input sample stream by a center frequency $f_n$, which is the center frequency channel over which the second signal was transmitted. A digital filter 380n may filter the downconverted sample stream to remove images caused by the digital downconversion and other undesired signal components.

The filtered signal may be sent to a receiver front end 385n, which processes the incoming signal. The front end 385n may measure the Rx AGC of the signal. As discussed above, the Rx AGC of the signal may be used to control the gain $G_{LNA}$ of the LNA 310. Further, the front end 385n may scale the filtered samples to obtain the desired amplitude and provide an output sample stream to a sample random access memory (RAM) 390n, which temporarily stores the sample stream.

The sample stream may be accessed from sample RAM 390n by a searcher 391n. The searcher 391n may be configured to search the sample stream for pilot signals received over the center frequency $f_n$. By identifying pilot signals with different PN offsets in the sample stream, for instance, the searcher 391n may identify additional access points transmitting over the center frequency $f_n$.

The sample stream may be accessed from sample RAM 390n by a CDMA demodulator 392n. The CDMA demodulator 392n demodulates the incoming CDMA stream into symbols. The signal may be sent to a demodulation symbol buffer 395n, to buffer the signal for further processing. The signal may be accessed from the buffer by a deinterleaver 396n, which may deinterleave (or reorder) the symbol estimates in a manner complementary to the interleaving performed by the transmitter that sent the signal. A decoder 398n (e.g., a viterbi decoder) may decode the deinterleaved symbol estimates and provide decoded data. In general, the processing by receiver 300 for each received signal may depend on the processing performed for the received signal by the transmitter or access point. Receiver 300 may be used in conjunction with one or more transmitters that can transmit using one or more air interfaces.

CDMA demodulator 392n may comprise a rake receiver and/or an equalizer receiver. The rake receiver may process the output sample stream for a first signal for one or more signal paths (or multipaths) detected for the first signal. The rake receiver may perform various functions such as despreading with a complex pseudo-random number (PN) sequence used by an access point, decovering with Walsh codes used for data, pilot and overhead channels, pilot estimation, coherent demodulation of the decovered symbols with pilot estimates, symbol combining across the multipaths, etc. The equalizer receiver may process the output sample stream for the first signal. The equalizer receiver may perform various functions such as pilot estimation, derivation/adaptation of filter coefficients, filtering of the output samples with the filter coefficients, despreading with the complex PN sequence, decovering with the Walsh codes, symbol scaling, etc.

Further, FIG. 3 illustrates one embodiment of the receive chain 301. However, in some embodiments, a receive chain may include one or more stages of amplifier, filter, mixer, and the like. These circuit blocks may further be arranged differently from the configuration shown in FIG. 3. A receive chain may also include different and/or additional circuit blocks not shown in FIG. 3. All or a portion of receive chain 301 may be implemented on one or more RF integrated circuits (RFICs), mixed-signal ICs, and the like. For example, LNA 310, mixer 330, and analog lowpass filter 340 may be implemented on an RFIC, e.g., an RF receiver (RFR) or an RF transmitter/receiver (RTR) chip.

Although described separately, it is to be appreciated that functional blocks described with respect to the receiver 300 may be combined or separate structural elements. For example, one or more components may be embodied in a single chip. One or more of the functional blocks and/or one or more combinations of the functional blocks described with respect to the receiver 300 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the receiver 300 may be implemented as a combination of computing devices, e.g., a combination of a DSP and a microprocessor, a plurality of microprocessors, one or more microprocessors in conjunction with a DSP communication, or any other such configuration.

Figure 4:
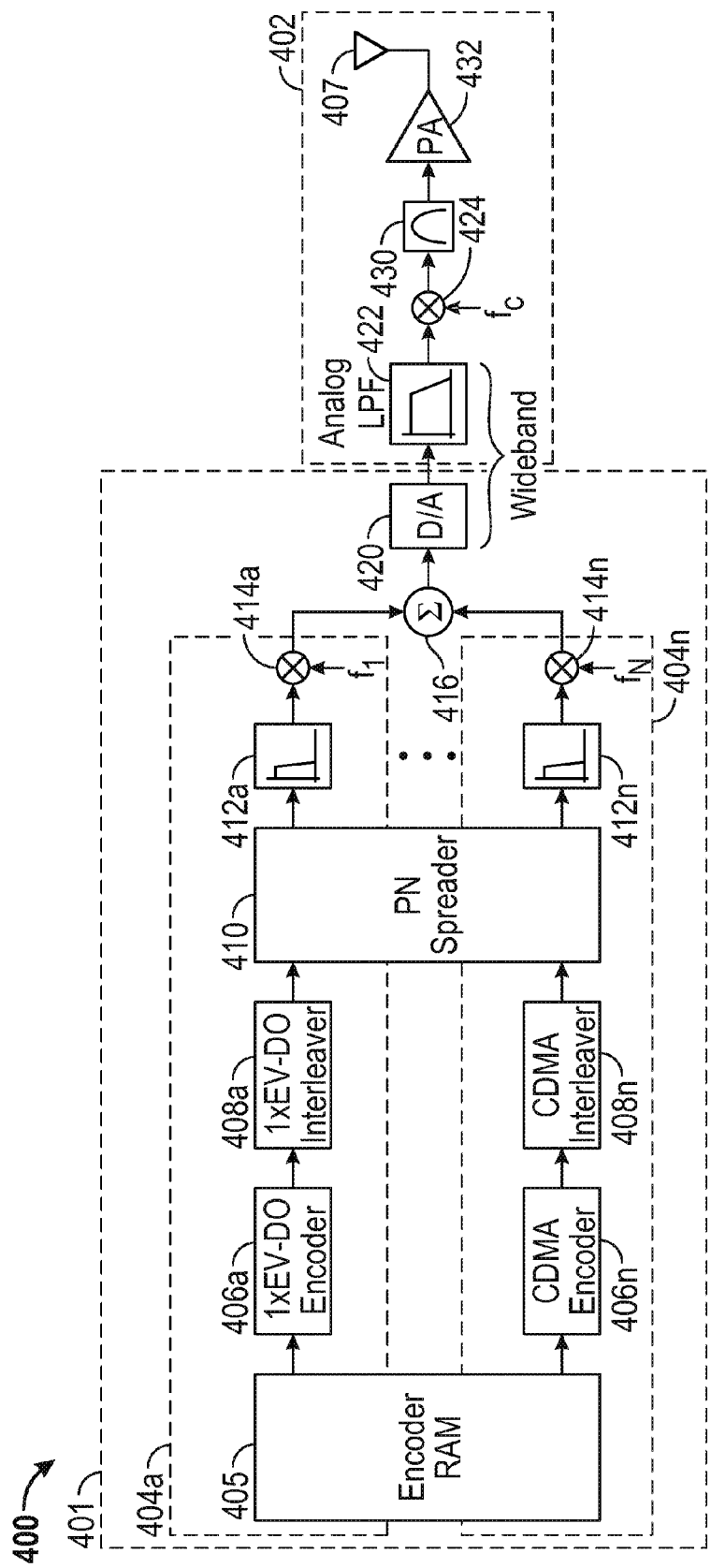
FIG. 4 is a functional block diagram of an example transmitter of a wireless communication device.

FIG. 4 is a functional block diagram of an example transmitter 400 of a wireless communication device, such as the wireless communication device 10 of FIG. 2. The transmitter 400 may, for example, illustrate components of the primary transceiver 260 with primary antenna 270 or the secondary transceiver 280 with secondary antenna 290. The function of the transmitter may be similar to that of the receiver, but functioning in reverse. The transmitter 400 may include a digital section 401 and a transmit chain 402. The digital section 401 may be divided into N digital process chains 404. Each digital process chain may correspond to an encoding path for a signal to be transmitted using a particular type of air interface. Each air interface may use a different coding scheme and different encoding hardware to encode the signal. Two paths are described, however, other paths may be provided in addition to or in place of the described paths. The first path 404a may correspond to the encoding path for a high data rate signal, such as a DO signal. The second path 404n may correspond to the encoding path for a voice signal, such as a 1xRTT signal.

The transmit chain 402 may transmit a signal including multiple signals sent over multiple air interfaces. Accordingly, rather than using multiple copies of each component in the transmit chain 402 to receive multiple signals over multiple air interfaces, a single copy of each component may be used. Further, components of the digital section 401 may be shared to process multiple signal received over multiple air interfaces. For example, a single digital-to-analog converter, a single encoder RAM, and a single PN spreader may be used for processing the multiple signals. This may reduce cost and/or complexity of the primary transceiver 260 or secondary transceiver 280.

An encoder random access memory (RAM) 405 of digital section 401 holds the digital data to be encoded and transmitted. The first path 404a may include a DO encoder 406a that encodes a first set of data into DO symbols. The encoded data may then be passed to a DO interleaver 408a, which orders the symbols. Similarly, the second path 404n may include a CDMA encoder 406n that encodes a second set of data into CDMA symbols. The encoded data may then be passed to a CDMA interleaver 408n, which orders the symbols by methods known in the art. Both the data streams are then passed to a pseudo noise (PN) spreader 410. PN spreader spreads each of the input sequences in accordance with one or more PN sequences as known in the art. The PN spreader provides the first set of encoded data to the digital filter 412a and the second set of encoded data to the digital filter 412n. Each digital filter 412 may filter its input symbols, perform upsampling, and provide a filtered sample stream to a rotator 414. Each rotator 414 may operate as a digital upconverter, frequency upconvert its filtered sample stream with a digital local oscillator (LO) signal, and provide an upconverted sample stream. Each rotator 414 may multiply the input sample stream by a center frequency $f_1$ to $f_n$. For example, the first set of encoded data may be multiplied by a frequency $f_1$ and the second set of encoded data may be multiplied by a frequency $f_n$. The frequency may be determined by the air interface and/or the carrier frequency that is used to transmit the signal. Each signal is then input to a summer 416 that sums the N upconverted sample streams from each rotator 414. The summed signal may then be passed to a digital-to-analog converter (DAC) 420, which converts the sample stream to analog and provided an analog baseband signal comprising the N signals. The analog baseband signal may then be sent to the transmit chain 402.

The transmit chain 402 may implement a super-heterodyne architecture or a direct-conversion architecture. In the super-heterodyne architecture, a baseband signal is frequency upconverted in multiple stages, for example, from baseband to an intermediate frequency (IF) in one stage, and then from IF to RF in another stage. In the direct-conversion architecture, which is also referred to as a zero-IF architecture, the baseband signal may be frequency upconverted from baseband directly to RF in one stage. The super-heterodyne and direct-conversion architectures may use different circuit blocks and/or have different circuit requirements. The following description assumes the use of the direct-conversion architecture as a non-limiting example.

An analog lowpass filter 422 of transmit chain 402 may filter the analog baseband signal from DAC 420 to remove images caused by the digital-to-analog conversion and provides a filtered signal. A mixer 424 frequency may upconvert the filtered signal from baseband to RF with an analog LO signal from an LO generator. The LO generator may include a voltage controlled oscillator (VCO), a phase locked loop (PLL), a reference oscillator, etc. Further, a variable gain amplifier (VGA) may amplify the upconverted signal from mixer 424 with a variable gain. A bandpass filter 430 may filter the signal to remove images caused by the frequency upconversion. Bandpass filter 430 may be a surface acoustic wave (SAW) filter, a ceramic filter, or some other type of filter. A power amplifier (PA) 432 amplifies the signal from filter 430 and provides an RF output signal having the proper power level. The RF output signal is transmitted via the antenna 407.

DAC 420 and transmit chain 402 may be wideband to support simultaneous transmission of multiple signals using multiple air interfaces. DAC 420 may be operated at a sufficiently high clock rate and may have sufficient resolution for conversion of a digital sample stream containing some or all N signals. Analog lowpass filter 422 may have a fixed or variable bandwidth that may be sufficiently wide to pass some or all of the signals being sent simultaneously. The subsequent analog circuit blocks may be wideband to pass some or all of the signals. Bandpass filter 430 may be wideband and may pass an entire frequency band, for example, from 824 to 849 MHz for cellular band and from 1850 to 1910 MHz for Personal Communications Service (PCS) band.

FIG. 4 illustrates one embodiment of transmit chain 402. However, in some embodiments, a transmit chain may include one or more stages of amplifier, filter, mixer, and the like. These circuit blocks may be arranged differently from the configuration shown in FIG. 4. A transmit chain may also include different and/or additional circuit blocks not shown in FIG. 4. All or a portion of transmit chain 402 may be implemented on one or more RF integrated circuits (RFICs), mixed-signal ICs, etc. For example, analog lowpass filter 422 and mixer 424 may be implemented on an RFIC, e.g., an RF transmitter (RFT) or an RF transmitter/receiver (RTR) chip.

Although described separately, it is to be appreciated that functional blocks described with respect to the transmitter 400 may be combined or separate structural elements. For example, one or more components may be embodied in a single chip. One or more of the functional blocks and/or one or more combinations of the functional blocks described with respect to the transmitter 400 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the transmitter 400 may also be implemented as a combination of computing devices, e.g., a combination of a DSP and a microprocessor, a plurality of microprocessors, one or more microprocessors in conjunction with a DSP communication, or any other such configuration.

The embodiments of primary transceiver 260 or secondary transceiver 280, such as those shown in FIGS. 3 and 4, may allow for components to be shared in the processing of multiple signals received and/or transmitted over multiple air interfaces. Accordingly, the cost of producing transceivers that communicate over multiple air interfaces such as primary transceiver 260 and secondary transceiver 280 may be reduced as fewer components are necessary. This may also decrease complexity and power consumption of the primary transceiver 260 or secondary transceiver 280.

Figure 5:
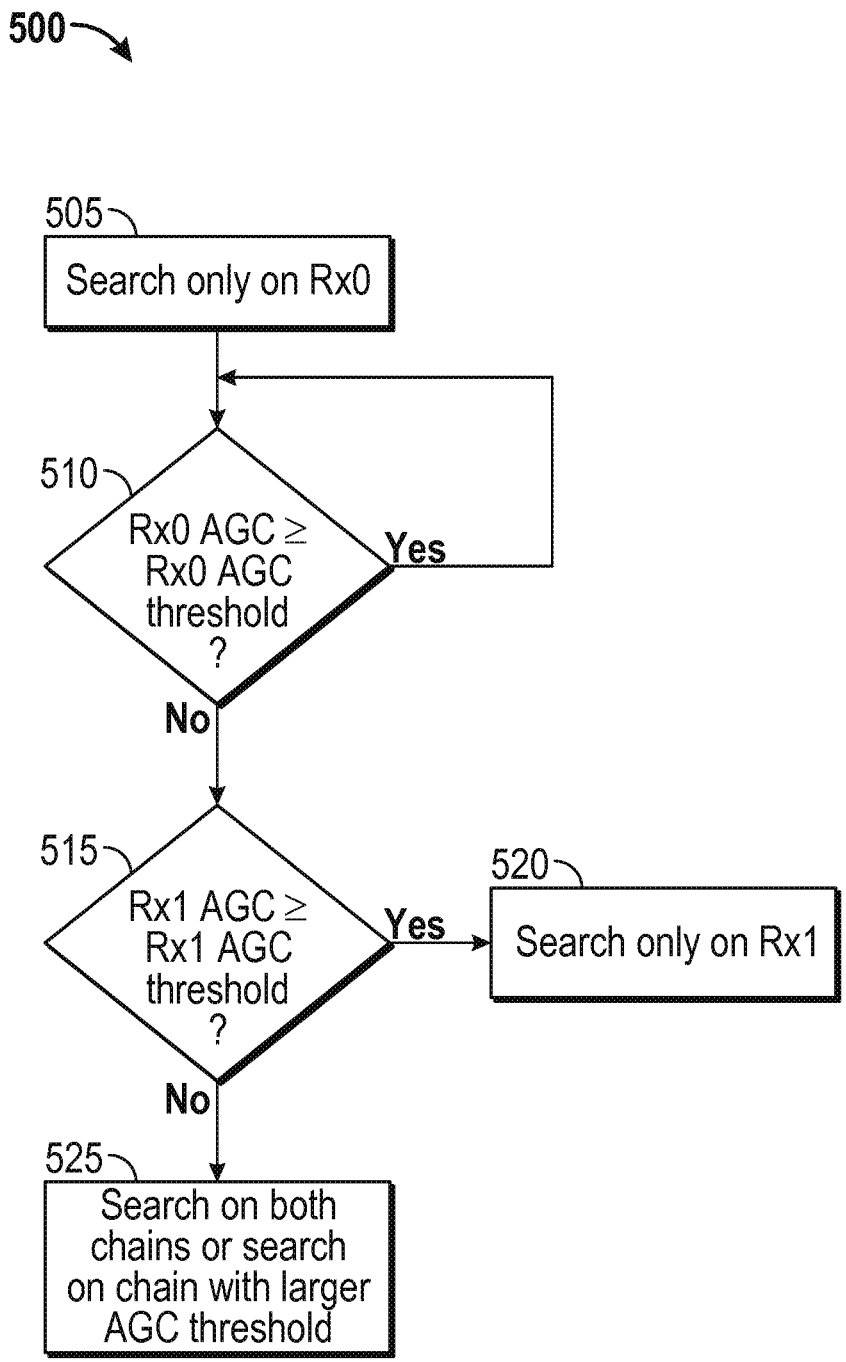
FIG. 5 is flowchart of an example process of antenna selection for a wireless communication device.

FIG. 5 is flowchart of an example process 500 of antenna selection for a wireless communication device, such as the wireless communication device 10 of FIG. 2. At block 505, the process 500 initiates at a state where a receive chain from only a primary antenna (Rx0) is being searched for pilot signals. At block 510, the process 500 determines whether the Rx AGC of the receive chain from the primary antenna (Rx0 AGC) equals or exceeds a primary antenna AGC threshold (Rx0 AGC threshold). If the Rx AGC of the receive chain from the primary antenna equals or exceeds the primary antenna AGC threshold, the search of the primary antenna receive chain for the pilot signals continues via only the primary antenna. On the other hand, if the Rx AGC of the receive chain from the primary antenna is below the primary antenna AGC threshold, the process moves to block 515.

At block 515, the process 500 determines whether the Rx AGC of the receive chain from the secondary antenna (Rx1 AGC) equals or exceeds a secondary antenna AGC threshold (Rx1 AGC threshold). If the Rx AGC of the receive chain from the secondary antenna equals or exceeds the secondary antenna AGC threshold, the process 500 moves to block 520 and the search for pilot signals switches to only the secondary antenna receive chain (Rx1). On the other hand, if the Rx AGC of the receive chain from the secondary antenna is below the secondary antenna AGC threshold, the process 500 may select one of two actions at block 525. In some embodiments, the process 500 may switch to searching for pilot signals via both the primary and secondary antenna receive chains. In other embodiments, the process 500 may search for pilot signals only via the antenna receive chain of the antenna having the larger Rx AGC value, and the process 500 accordingly continues the search for pilot signals via the primary antenna receive chain or switches to searching via the secondary antenna receive chain.

Figure 6:
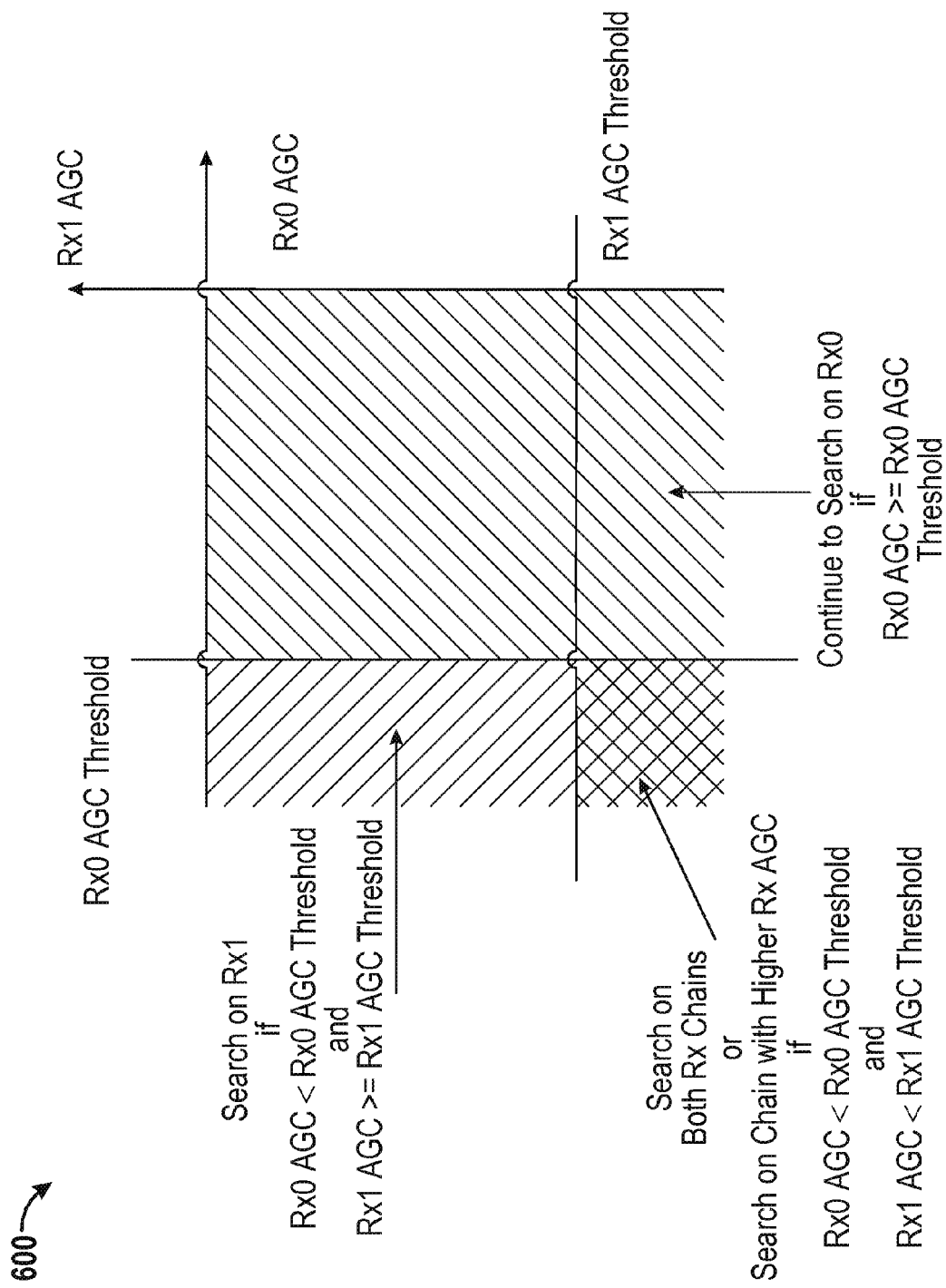
FIG. 6 is a graph illustrating example conditions of the process of FIG. 5.

FIG. 6 is a graph 600 illustrating example conditions for the process 500 of FIG. 5. The initial condition for this graph 600 may be where the primary antenna receive chain (Rx0) is currently being searched for pilot signals. The primary antenna receive chain may continue to be searched for the pilot signals as long as the Rx AGC of the primary antenna receive chain (Rx0 AGC) is above the primary antenna AGC threshold (Rx0 AGC threshold). Once the Rx AGC of the primary antenna receive chain is below the primary antenna AGC threshold, it may be determined whether the Rx AGC of the secondary antenna receive chain (Rx1 AGC) equals to or exceeds the secondary antenna AGC threshold (Rx1 AGC threshold). If the Rx AGC of the receive chain from the secondary antenna equals or exceeds the secondary antenna AGC threshold, the search for pilot signals switches to the secondary antenna receive chain. If the Rx AGC of the receive chain from the secondary antenna does not equal or exceed the secondary antenna AGC threshold, the search for pilot signals may switch to both the primary and secondary antenna receive chains or switch to or continue via the receive chain of the antenna having the larger Rx AGC value.

Figure 7:
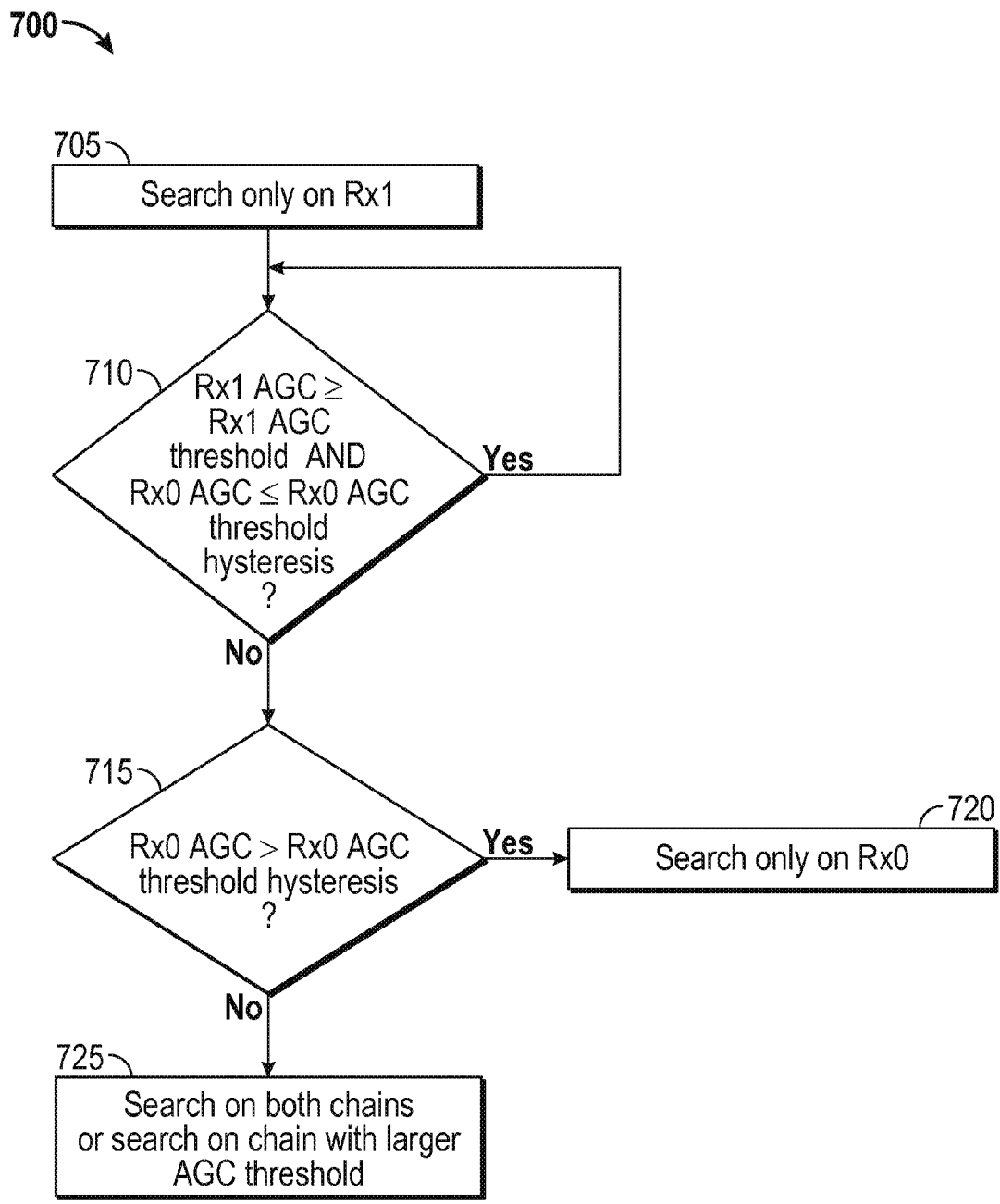
FIG. 7 is flowchart of another example process of antenna selection for a wireless communication device.

FIG. 7 is flowchart of an example process 700 of antenna selection for a wireless communication device, such as the wireless communication device 10 of FIG. 2. As part of the conditions for process 700, a primary antenna AGC threshold may exhibit hysteresis, and the primary antenna threshold value may increase or decrease depending on whether the primary antenna receive chain, secondary antenna receive chain, or both the primary and secondary antennas receive chains are currently or previously searched for pilot signals. The resulting primary antenna AGC threshold value comprising the impact of hysteresis may be termed "primary antenna AGC threshold hysteresis." In other embodiments, the primary antenna AGC threshold may not exhibit hysteresis.

At block 705, the process 700 initiates at a state where a receive chain from only a second antenna (Rx1) is being searched for pilot signals. At block 710, the process 700 determines whether the Rx AGC of the secondary antenna receive chain (Rx1 AGC) equals or exceeds a secondary antenna AGC threshold (Rx1 AGC threshold) and the Rx AGC of the receive chain from the primary antenna (Rx0 AGC) is below or equals a primary antenna AGC threshold hysteresis (Rx0 AGC threshold hysteresis). If the determination at block 710 is yes, the search for the pilot signals continues via only the secondary antenna receive chain. On the other hand, if the determination of at block 710 is no, the process moves to block 715.

At block 715, the process 700 determines whether the Rx AGC of the receive chain from the primary antenna is above a primary antenna AGC threshold hysteresis. If so, the process moves to block 720, and the search switches to searching for pilot signals via only the primary antenna receive chain. On the other hand, if the Rx AGC of the receive chain from the primary antenna is not above a primary antenna AGC threshold hysteresis, the process 700 moves to block 725 where searching for pilot signals may occur either via both the primary and secondary antenna receive chains or via the receive chain of the antenna having the larger Rx AGC value.

Figure 8:
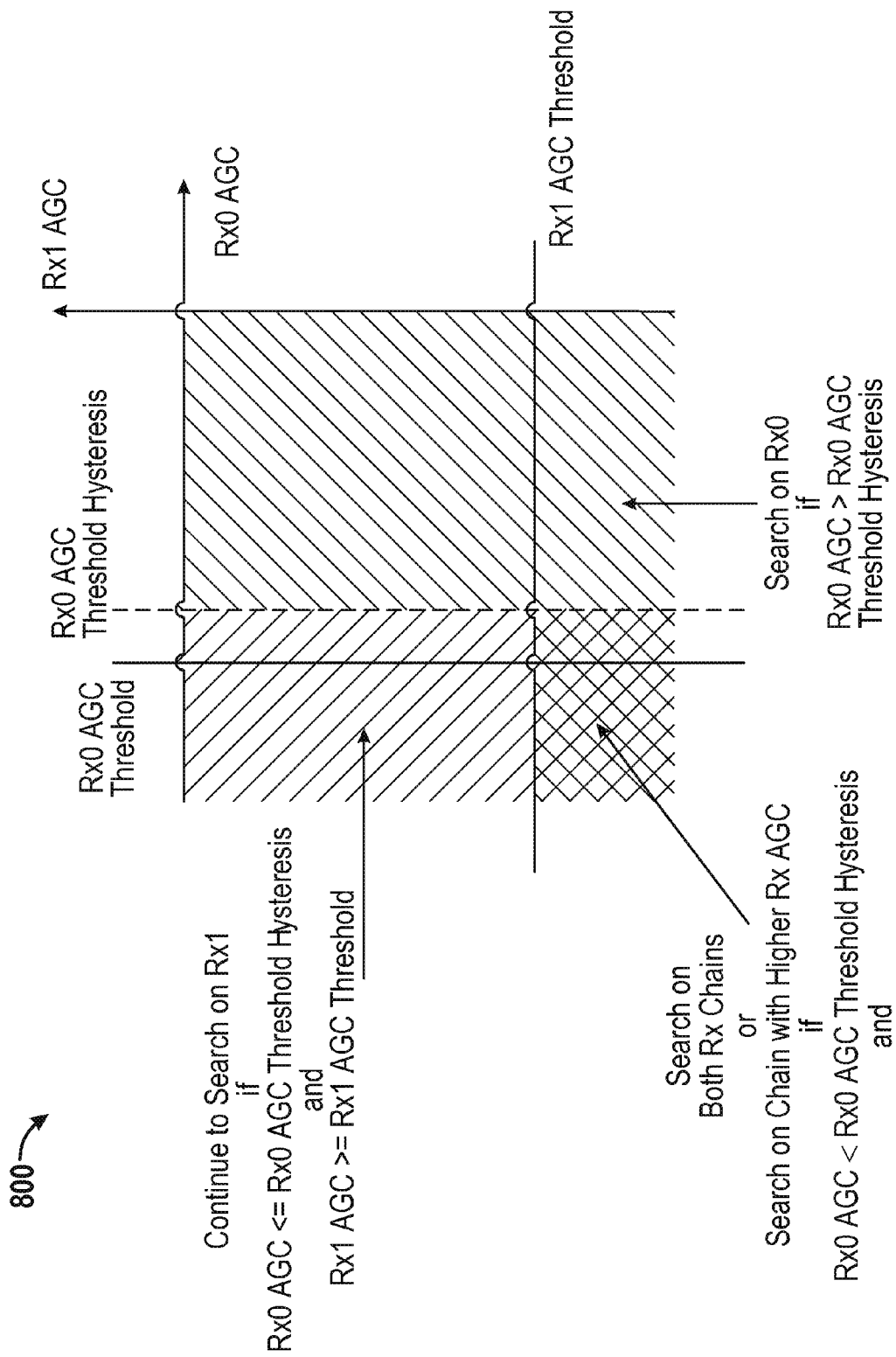
FIG. 8 is a graph illustrating example conditions of the process of FIG. 7.

FIG. 8 is a graph 800 illustrating example conditions for the process 700 of FIG. 7. The initial condition for this graph 800 may be where the secondary antenna receive chain (Rx1) is being searched for pilot signals. The secondary antenna chain continues to be searched as long as the Rx AGC of the secondary antenna receive chain (Rx1 AGC) exceeds the secondary antenna AGC threshold (Rx1 AGC threshold) and the Rx AGC of the primary antenna receive chain (Rx0 AGC) is below the primary antenna AGC threshold hysteresis (Rx0 AGC threshold hysteresis). If the Rx AGC of the primary antenna receive chain exceeds the primary antenna AGC threshold hysteresis, the search for pilot signals the switches to only the primary antenna receive chain. However, if the Rx AGC value of the secondary antenna receive chain is below the secondary antenna AGC threshold and the Rx AGC value of the primary antenna receive chain is below the primary antenna AGC threshold hysteresis, one of two actions may be initiated. In certain embodiments, the search for pilot signals may switch to both the primary and secondary antenna receive chains. In other embodiments, the search for pilot signals may switch to or continue via the antenna receive chain of the antenna having the larger Rx AGC value.

Figure 9:
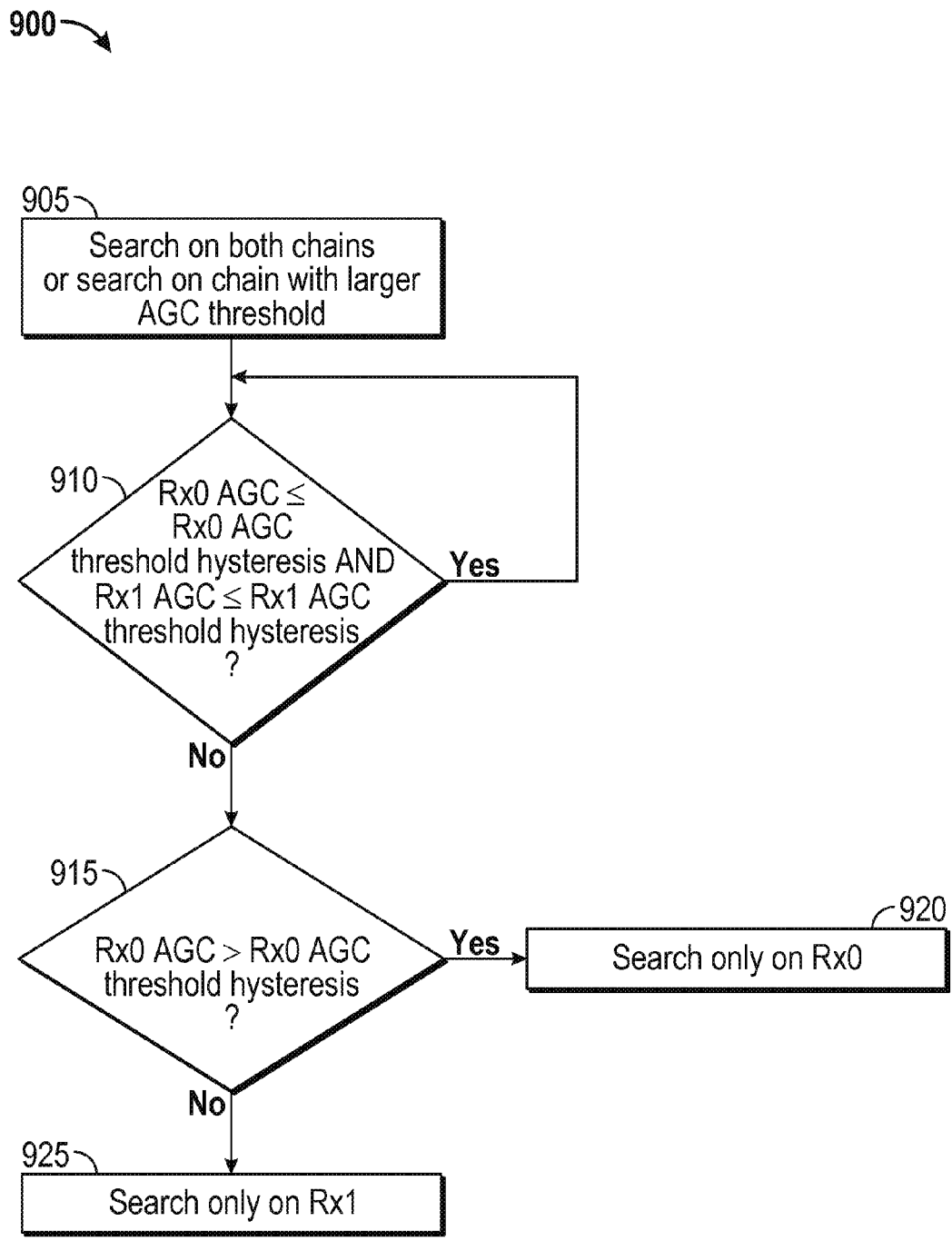
FIG. 9 is flowchart of yet another example process of antenna selection for a wireless communication device.

FIG. 9 is flowchart of an example process 900 of antenna selection for a wireless communication device, such as the wireless communication device 10. As part of the conditions for process 900, a first antenna AGC threshold and a second antenna AGC threshold may exhibit hysteresis, and the threshold values may increase or decrease depending on the whether the primary antenna, secondary antenna, or both primary and secondary antennas are currently or previously searched for pilot signals. The resulting threshold values comprising the impact of hysteresis may be termed "AGC threshold hysteresis." In some embodiments, the primary antenna AGC threshold and the secondary antenna AGC threshold may not exhibit hysteresis.

At a block 905, the process 900 initiates at a state where a searching for pilot signals may occur either via both a primary antenna receive chain (Rx0) as well as a secondary antenna receive chain (Rx1) or via the receive chain of the antenna having the larger Rx AGC value. At block 910, the process 900 determines whether the Rx AGC of the secondary antenna receive chain (Rx1 AGC) is below or equals a secondary antenna AGC threshold hysteresis (Rx1 AGC threshold hysteresis) and the Rx AGC of the receive chain from the primary antenna (Rx0 AGC) is below or equals a primary antenna AGC threshold hysteresis (Rx0 AGC threshold hysteresis). If the determination at block 910 is yes, then the search for the pilot signal continues either via both the primary and secondary antenna receive chains or via the receive chain of the antenna having the larger Rx AGC value. If the determination at block 910 is no, the process moves to block 915.

At block 915, the process 900 determines whether the Rx AGC of the receive chain from the primary antenna is above the primary antenna AGC threshold hysteresis. If so, the process 900 moves to block 920, and the process 900 switches to or continues searching for pilot signals via only the primary antenna receive chain. On the other hand, if the Rx AGC of the receive chain from the primary antenna does not equal or exceed the primary antenna AGC threshold hysteresis, the process 900 moves to block 925 where the search for pilot signals switches to or continues via the secondary antenna receive chain.

Figure 10:
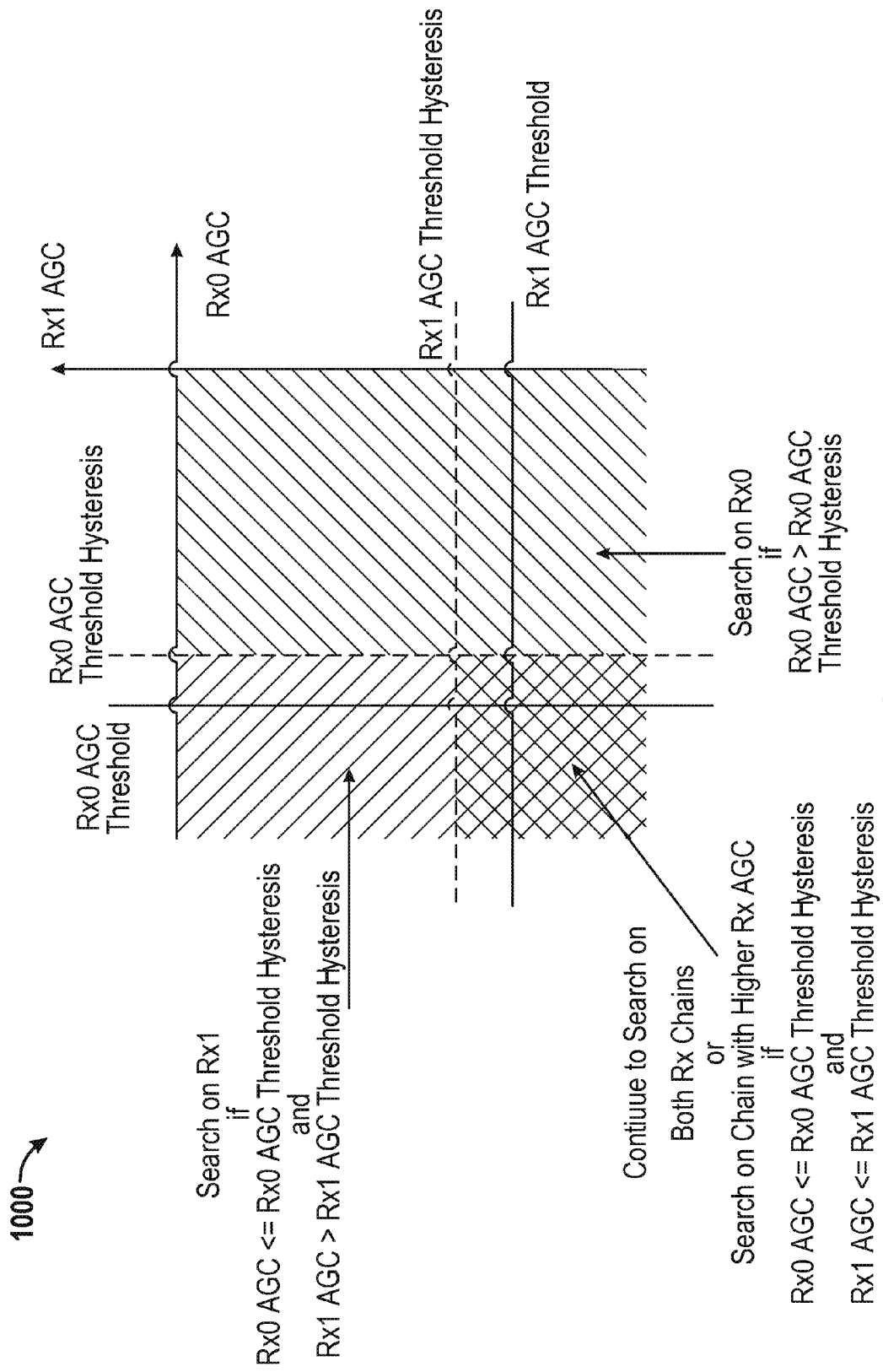
FIG. 10 is a graph illustrating example conditions of the process of FIG. 9.

FIG. 10 is a graph 1000 illustrating example conditions for the process 900 of FIG. 9. The initial condition for this graph 900 may be where the processor is searching for pilot signals either via both the primary antenna receive chain (Rx0) as well as the secondary antenna receive chain (Rx1) or via the receive chain of the antenna having the larger Rx AGC value. This initial condition may continue as long as the Rx AGC of the primary antenna receive chain (Rx0 AGC) is below or equals the primary antenna AGC threshold hysteresis (Rx0 AGC threshold hysteresis) and the Rx AGC of the secondary antenna receive chain (Rx1 AGC) is below or equals the secondary antenna AGC threshold hysteresis (Rx1 AGC threshold hysteresis). Once the Rx AGC of the primary antenna receive chain exceeds the primary antenna AGC threshold hysteresis, the search for pilot signals switches to or continues via only the primary antenna receive chain. On the other hand, if the Rx AGC value of the primary antenna receive chain is below or equals the primary antenna AGC threshold hysteresis and the Rx AGC value of the secondary antenna receive chain exceeds the secondary antenna AGC threshold hysteresis, the search for pilot signals switches to or continues via only the secondary antenna receive chain.

Figure 11:
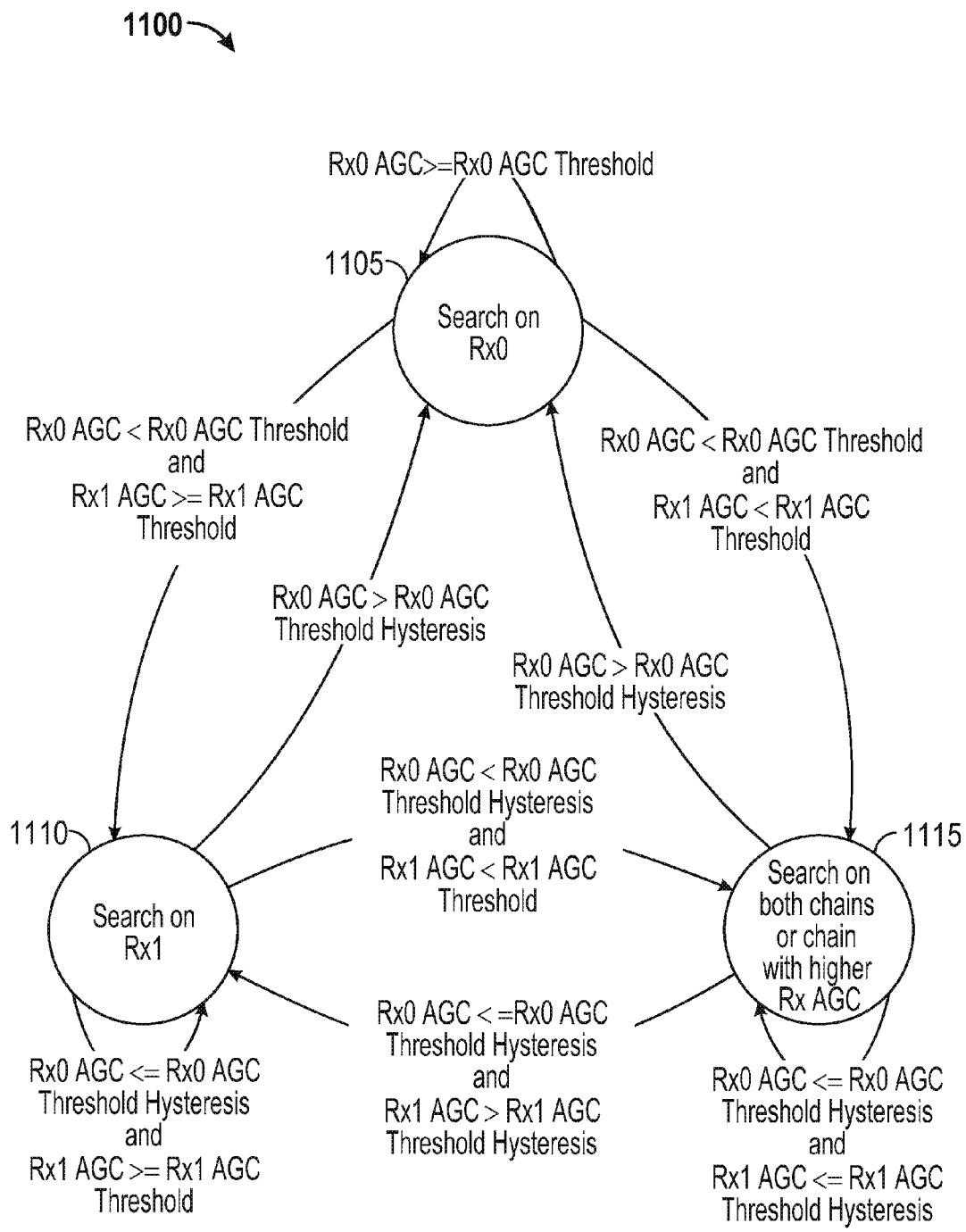
FIG. 11 is a state diagram illustrating an example antenna searching process for a primary and secondary receive chain.

FIG. 11 is a state diagram 1100 illustrating an example antenna searching process for a primary and secondary receive chain. The state transition conditions for the state diagram 1100 may be checked on a periodic basis or prior to each set of searches for active pilots, for instance. Further, in some aspects, demodulation of the signals may continue on the primary and secondary receive chains while searching for pilot signals continues via the primary and/or secondary antenna receive chains.

State 1105 may comprise a condition where the search for pilot signals occurs via the primary antenna receive chain (Rx0) and not via the secondary antenna receive chain (Rx1). From state 1105, the state may change to state 1110 if the Rx AGC of the primary antenna receive chain (Rx0 AGC) is below the primary antenna AGC threshold (Rx0 AGC threshold) and the Rx AGC of the secondary antenna receive chain (Rx1 AGC) equals or exceeds the secondary antenna AGC threshold (Rx1 AGC threshold). Alternatively, from state 1105, if the Rx AGC of the primary antenna receive chain is below the primary antenna AGC threshold and the Rx AGC of the secondary antenna receive chain is below the secondary antenna AGC threshold, the state may change to state 1115. In some aspects, the primary antenna receive chain may have a greater robustness and/or linearity, and the like, than the secondary antenna receive chain. Accordingly, as long as the Rx AGC of the primary antenna receive chain equals or exceeds one or more thresholds, the primary antenna receive chain may be favored over the secondary antenna receive chain and state 1105 may be favored over states 1110, 1115.

State 1110 may comprise a condition where the search for pilot signals occurs via the secondary antenna receive chain and not the primary antenna receive chain. From state 1110, the state may change to state 1105 if the Rx AGC of the primary antenna receive chain exceeds the primary antenna AGC threshold hysteresis. Alternatively, from state 1110, if the Rx AGC of the primary antenna receive chain is below the primary antenna AGC threshold hysteresis and the Rx AGC of the secondary antenna receive chain is below the secondary antenna AGC threshold, the state may change to state 1115. In some aspects, when at state 1110, a receive diversity function may be enabled and prevented from being disabled (e.g., capacity or quality metrics used to turn off receive diversity may be overridden) so that the secondary antenna receive chain may remain accessible for use in searching for the pilot signals. Further, in some aspects, the hysteresis component of the primary antenna AGC threshold hysteresis may be determined or selected to increase the threshold level for transitioning from state 1110 to states 1105, 1115 and thus to reduce an overall number of expected state transitions.

State 1115 may comprise a condition where the search for pilot signals occurs either via both the primary and secondary antenna receive chains or via the receive chain of the antenna having the larger Rx AGC value. In some aspects, the search approach utilized at state 1115 may be programmed at the time of manufacture of a device, determined based on the type or location of a device, or selected from testing both approaches and using the approach which is more successful or meets particular system capacity constraints, for example. From state 1115, the state may change to state 1105 if the Rx AGC of the primary antenna receive chain exceeds the primary antenna AGC threshold hysteresis. Alternatively, from state 1115, if the Rx AGC of the primary antenna receive chain equals or is below the primary antenna AGC threshold hysteresis and the Rx AGC of the secondary antenna receive chain exceeds the secondary antenna AGC threshold hysteresis, the state may change to state 1110. In some aspects, when at state 1115, a receive diversity function may be enabled and prevented from being disabled (e.g., capacity or quality metrics used to turn off receive diversity may be overridden) so that the secondary antenna receive chain may remain accessible for use in searching for the pilot signals. Further, in some aspects, the hysteresis component of the primary and secondary antenna AGC threshold hysteresis may be determined or selected to increase the threshold level for transitioning from state 1115 to states 1105, 1110 and thus to reduce an overall number of expected state transitions.

In addition, in some aspects, the various thresholds described with respect to the state diagram 1100 may, for instance, be programmed at manufacture of a device or determined based on the operating conditions for a device, and the like.

Figure 12:
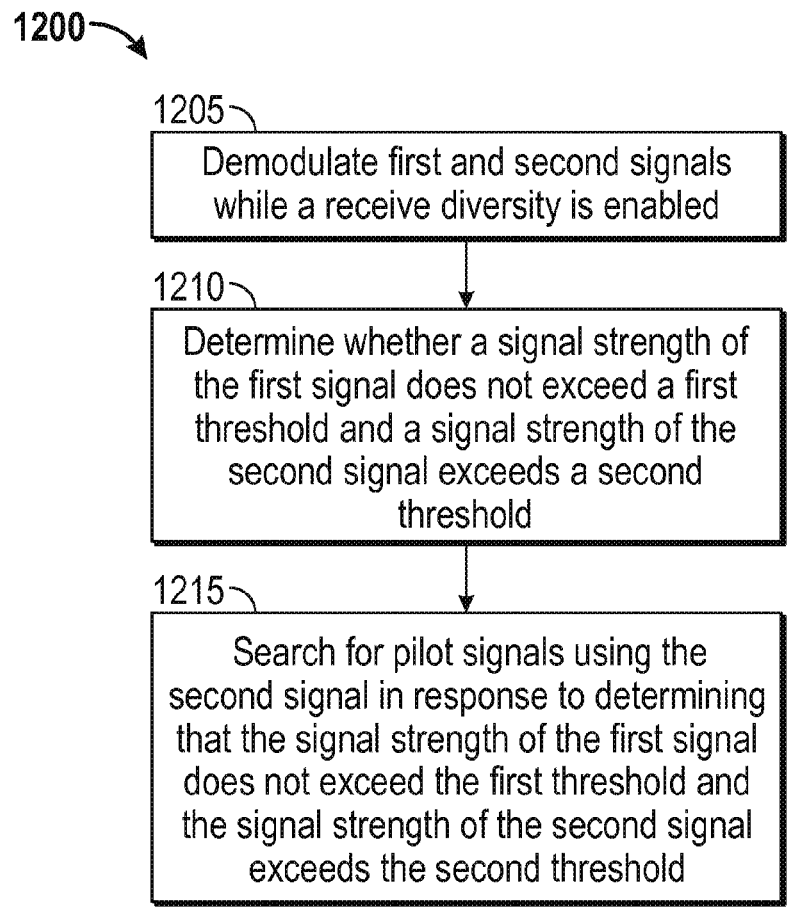
FIG. 12 is flowchart of an example method of antenna searching.

FIG. 12 is flowchart of an example method 1200 of antenna searching. Although the method 1200 is described with respect to the elements of the wireless device 10, other components may be used to implement one or more of the steps described herein.

At block 1205, first and second signals are demodulated while a receive diversity is enabled. A first receiver may have received the first signal, which includes pilot signals, from a first antenna. A second receiver may have received the second signal, which includes pilot signals, from a second antenna. The demodulation may be performed by the processor 210 and/or primary and secondary transceivers 260, 280 of FIG. 2, for example.

At block 1210, it may be determined whether a signal strength of the first signal does not exceed a first threshold and a signal strength of the second signal exceeds a second threshold. The determination may be performed by the processor 210 of FIG. 2, for example.

At block 1215, the second signal and not the first signal may be searched for pilot signals in response to determining that the signal strength of the first signal does not exceed the first threshold and the signal strength of the second signal exceeds the second threshold. The searching may be performed by the processor 210 of FIG. 2, for example.

Figure 13:
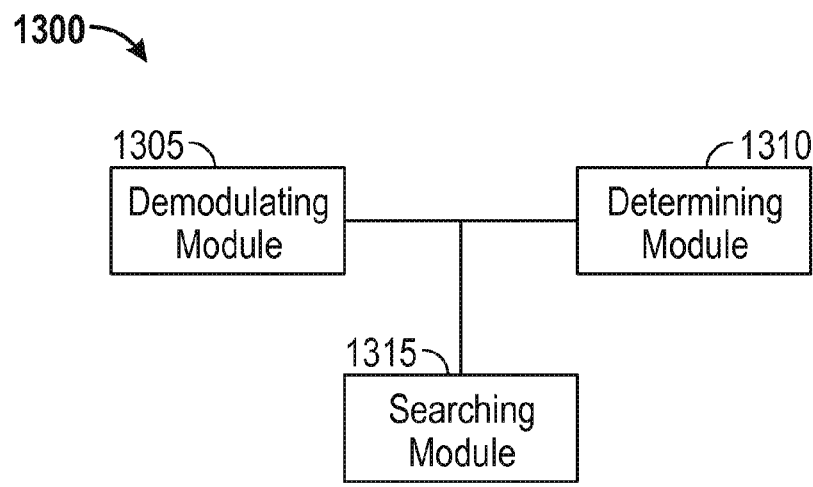
FIG. 13 is a functional block diagram of an example device.

FIG. 13 is a functional block diagram of an example device 1300, such as the wireless communication device 10 of FIG. 1. The device 1300 includes a demodulating module 1305 for demodulating first and second signals while a receive diversity is enabled. The demodulating module 1305 may be configured to perform one or more of the functions discussed above with respect to block 1205 of FIG. 12. The demodulating module 1305 may correspond to the processor 210 of FIG. 2. Further, the device 1300 includes a determining module 1310 for determining whether a signal strength of the first signal does not exceed a first threshold and a signal strength of the second signal exceeds a second threshold. The determining module 1310 may be configured to perform one or more of the functions discussed above with respect to block 1210 of FIG. 12. The determining module 1310 may correspond to the processor 210 of FIG. 2. In addition, the device 1300 includes a searching module 1315 for searching for pilot signals using the second signal in response to determining that the signal strength of the first signal does not exceed the first threshold and the signal strength of the second signal exceeds the second threshold. The searching module 1315 may be configured to perform one or more of the functions discussed above with respect to block 1215 of FIG. 12. The searching module 1315 may correspond to the processor 210 of FIG. 2.

Moreover, in one aspect, means for demodulating signals may comprise the demodulating module 1305. In yet another aspect, means for determining whether a signal strength does or does not exceed a threshold may comprise the determining module 1310. In a further aspect, means for searching for pilot signals may comprise the searching module 1315.

What is claimed is:

1. An apparatus operable in a wireless communication system, the apparatus comprising:
    a first receiver configured to receive a first signal from a first antenna, the first signal comprising pilot signals;
    a second receiver configured to receive a second signal from a second antenna, the second signal comprising pilot signals; and
    a processor configured to, while a receive diversity is enabled, demodulate the first and second signals,
        determine whether a first condition is satisfied, the first condition satisfied when a signal strength of the first signal does not exceed a first threshold and a signal strength of the second signal exceeds a second threshold, the first and second thresholds providing a hysteresis with respect to antenna selection,
        in response to determining that the first condition is satisfied, search for pilot signals via the second receiver and not the first receiver,
        determine whether the first or second signal has a greater signal strength and whether a second condition is satisfied, the second condition satisfied when the signal strength of the first signal does not exceed the first threshold and the signal strength of the second signal does not exceed the second threshold,
        in response to determining that the first signal has the greater signal strength and the second condition is satisfied, search for the pilot signals via the first receiver and not the second receiver, and
        in response to determining that the second signal has the greater signal strength and the second condition is satisfied, search for the pilot signals via the second receiver and not the first receiver.

2. The apparatus of claim 1, wherein the processor is further configured to determine whether the first condition is satisfied based on gain control values of the first and second receiver.

3. The apparatus of claim 1, wherein the processor is further configured to periodically determine whether the first condition is satisfied.

4. The apparatus of claim 1, wherein the processor is further configured to prevent disabling of the receive diversity while the processor searches for the pilot signals via the second receiver, the receive diversity comprising a mobile receive diversity.

5. The apparatus of claim 1, wherein the first or second threshold depends at least in part on whether searching for the pilot signal occurs via the first receiver and not the second receiver, via the second receiver and not the first receiver, or via the first and second receiver.

6. A method of antenna searching implemented in a wireless communication device, the method comprising:
    demodulating first and second signals while a receive diversity is enabled, the first signal comprising pilot signals and received by a first receiver from a first antenna, the second signal comprising pilot signals and received by a second receiver from a second antenna;
    determining whether a first condition is satisfied, the first condition satisfied when a signal strength of the first signal does not exceed a first threshold and a signal strength of the second signal exceeds a second threshold, the first and second thresholds providing a hysteresis with respect to antenna selection;
    in response to determining that the first condition is satisfied, searching for pilot signals via the second receiver and not the first receiver,
    determining whether the first or second signal has a greater signal strength and whether a second condition is satisfied, the second condition satisfied when the signal strength of the first signal does not exceed the first threshold and the signal strength of the second signal does not exceed the second threshold;
    in response to determining that the first signal has the greater signal strength and the second condition is satisfied, searching for the pilot signals via the first receiver and not the second receiver; and
    in response to determining that the second signal has the greater signal strength and the second condition is satisfied, searching for the pilot signals via the second receiver and not the first receiver.

7. The method of claim 6, further comprising determining whether the first condition is satisfied based on gain control values of the first and second receiver.

8. The method of claim 6, further comprising periodically determining whether the first condition is satisfied.

9. The method of claim 6, further comprising preventing disabling of the receive diversity while searching for the pilot signals via the second receiver, the receive diversity comprising a mobile receive diversity.

10. The method of claim 6, wherein the first or second threshold depends at least in part on whether searching for the pilot signal occurs via the first receiver and not the second receiver, via the second receiver and not the first receiver, or via the first and second receiver.

11. An apparatus operable in a wireless communication system, the apparatus comprising:
    first means for receiving a first signal from a first antenna, the first signal comprising pilot signals;
    second means for receiving a second signal from a second antenna, the second signal comprising pilot signals;
    means for demodulating the first and second signals while a receive diversity is enabled;
    means for determining whether a first condition is satisfied, the first condition satisfied when a signal strength of the first signal does not exceed a first threshold and a signal strength of the second signal exceeds a second threshold, the first and second thresholds providing a hysteresis with respect to antenna selection;
    means for searching for pilot signals via the second means and not the first means in response to determining that the first condition is satisfied;
    means for determining whether the first or second signal has a greater signal strength and whether a second condition is satisfied, the second condition satisfied when the signal strength of the first signal does not exceed the first threshold and the signal strength of the second signal does not exceed the second threshold;
    means for searching for the pilot signals via the first receiver and not the second receiver in response to determining that the first signal has the greater signal strength and the second condition is satisfied; and means for searching for the pilot signals via the second receiver and not the first receiver in response to determining that the second signal has the greater signal strength and the second condition is satisfied.

12. A non-transitory computer readable medium comprising instructions that when executed cause an apparatus to:

demodulate first and second signals while a receive diversity is enabled, the first signal comprising pilot signals and received by a first receiver from a first antenna, the second signal comprising pilot signals and received by a second receiver from a second antenna;

determine whether a first condition is satisfied, the first condition satisfied when a signal strength of the first signal does not exceed a first threshold and a signal strength of the second signal exceeds a second threshold, the first and second thresholds providing a hysteresis with respect to antenna selection;

in response to determining that the first condition is satisfied, search for pilot signals via the second receiver and not the first receiver;

determine whether the first or second signal has a greater signal strength and whether a second condition is satisfied, the second condition satisfied when the signal strength of the first signal does not exceed the first threshold and the signal strength of the second signal does not exceed the second threshold;

search for the pilot signals via the first receiver and not the second receiver in response to determining that the first signal has the greater signal strength and the second condition is satisfied; and search for the pilot signals via the second receiver and not the first receiver in response to determining that the second signal has the greater signal strength and the second condition is satisfied.

* * * * *